April 11, 1939.  H. SCHEWE  2,154,287

ELECTRICAL CONTROL SYSTEM

Filed March 5, 1936

WITNESSES:
P. J. Fitzgerald
R. R. Lockwood

INVENTOR
Heinrich Schewe.
BY
J. M. Crawford
ATTORNEY

Patented Apr. 11, 1939

2,154,287

UNITED STATES PATENT OFFICE 2,154,287

ELECTRICAL CONTROL SYSTEM

Heinrich Schewe, Berlin-Charlottenburg, Germany, assignor to Westinghouse Electric & Manufacturing Company, East Pittsburgh, Pa., a corporation of Pennsylvania Application March 5, 1936, Serial No. 67,254
In Germany June 20, 1935

16 Claims. (Cl. 250—27)

This invention relates, generally, to electrical control systems, and, it has particular relation to such systems when employed for controlling the flow of current to a load device.

In electrical systems, such as systems for controlling the flow of current to a resistance welding device, it is desirable to periodically vary the welding current for the purpose of preventing burning of the material being welded and ensuring that good welds are made. In order to vary the current flowing to the welder, it has been proposed to connect electric valves in series circuit relation with the welding transformer. The electric valves may be controlled by suitable devices so that the welding current is varied in a predetermined manner.

The object of this invention, generally stated, is to provide an electric control system which shall be simple and efficient in operation and which may be readily and economically manufactured and installed.

An important object of this invention is to provide for controlling the flow of current from an alternating-current source to a load device.

Another important object of this invention is to provide for periodically permitting alternating current to flow to a load device, such as a resistance welder.

Another object of the invention is to provide for varying the output of a high frequency generator to, in turn, control the flow of alternating current to a load device.

Still another object of the invention is to provide for periodically changing the output of a high frequency generator to permit alternating current to flow during predetermined intervals to a load device.

Other objects of the invention will in part be obvious and in part appear hereinafter.

Accordingly, the invention is disclosed in the embodiment hereof shown in the accompanying drawing, and comprises the features of construction, combination of elements, and arrangement of parts which will be exemplified in the constructions hereinafter set forth, and the scope of the application of which may be indicated in the appended claims.

Figure 1:
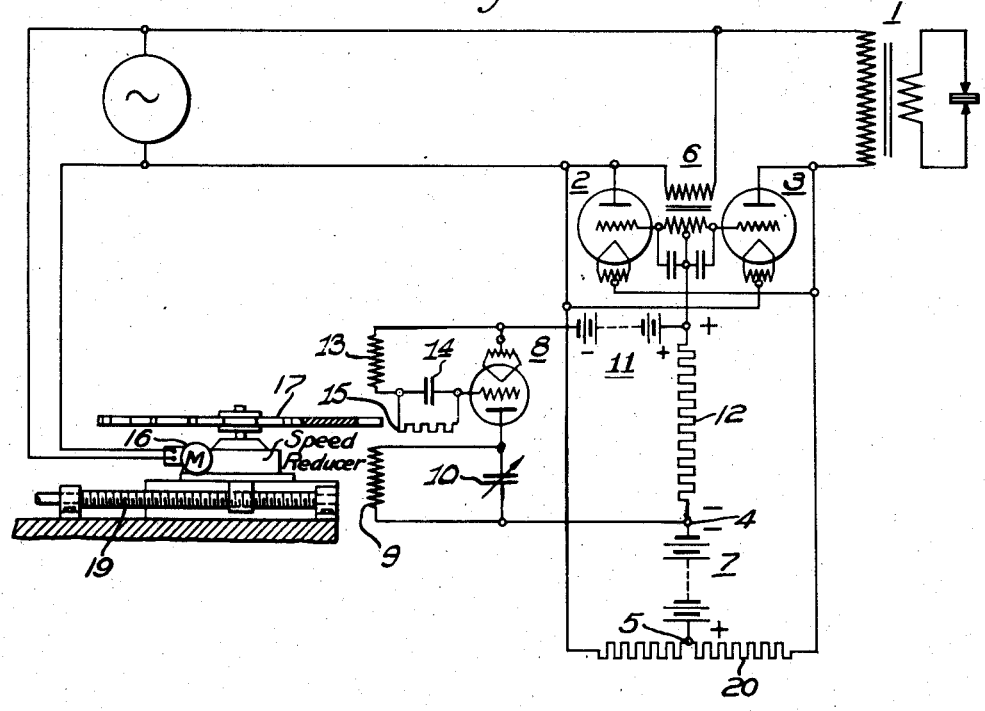
Figure 2:
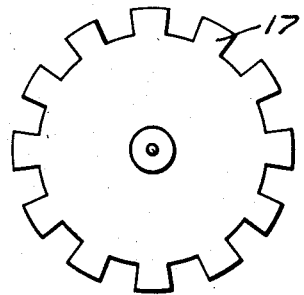
Figure 3:
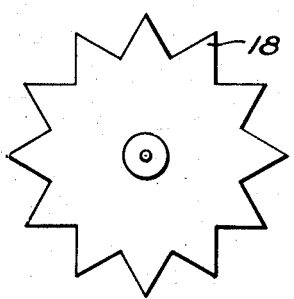

For a more complete understanding of the nature and scope of the invention, reference may be had to the following detailed description, taken in connection with the accompanying drawing, in which:

Figure 1 illustrates diagrammatically a control system organized in accordance with this invention; and Figs. 2 and 3 are top plan views showing different modifications of a disc or template which may be used to cause alternating current to flow to a load device periodically.

This invention relates to an arrangement which is particularly suitable to control the flow of alternating current for performing resistance welding operations. According to the invention, a contactless device is provided in which inductive or capacitive energy interchanges between two fixed parts, is controlled by means of a movable disc or template, and is used to control the flow of current to a load device. In order to make possible the use of small capacitors in the system, it is desirable to so arrange it that alternating current of high frequency is generated. However, the system may be operated with alternating current having a frequency in the audible range, but it is preferable to employ frequencies above the audible range. The invention may be practiced by placing an inductor, which is supplied with high or audio frequency current, in inductive relation with another inductor, connected in the circuit of the grid of an amplifier tube, which serves to control an electric valve in a load circuit, whereby the current flowing therein is controlled. With the aid of a rotating template or disc of good conducting material, the energy interchanged between the two inductors may be varied, and thereby a control effect will result in the flow of current to the load device.

The invention may also be operated or practiced in a similar manner by causing the rotating template or disc to vary the capacitance of a capacitor operating to transfer the controlling energy. The energy transfer between two inductors may also be effected by connecting a capacitor to one of them, which transfers the controlling impulse to the electric valves in the load circuit and tuning the resultant oscillating circuit to the frequency of the audio or high-frequency auxiliary current which is to be employed. By varying either the frequency range of the oscillating circuit or the capacitance thereof by means of the rotating template, a change in the tuning thereof will occur which, in turn, produces corresponding changes in the flow of alternating current to the load device. These methods require a separate auxiliary source of potential, which may be avoided, according to the invention, by permitting the template or disc to control the degree of back-coupling of an oscillation generator. In this manner, the intensity of the generated high or audio frequency current and the intensity of the anode current of the electric valve of the oscillator generator may be controlled, and thereby the desired control effect may be accomplished.

Referring now particularly to Fig. 1 of the drawing, it will be observed that a system is there shown in which the degree of back-coupling of an oscillation generator is varied. As is there illustrated, a welding transformer 1 is provided which is arranged to supply alternating current to a load device, such as a resistance welder, from a source of alternating current. Interposed between the alternating-current source and the primary winding of the transformer 1 is a pair of inversely connected electric valves 2 and 3. The valves 2 and 3 may be maintained in the non-conducting state by means of a biasing potential, which is impressed between the terminals 4 and 5 and on the grids of the valves 2 and 3. A transformer, shown generally at 6, in combination with a resistor 20, is provided so that a single biasing source 7 may be employed for maintaining both of the valves 2 and 3 in the non-conducting state.

According to the invention, it is desirable to produce a control potential between the terminals 4 and 5 to overcome the biasing potential provided by the direct-current source 7. This control potential is produced by means of a high-frequency generator, which includes an electric valve 8 that is preferably of the high-vacuum hot-cathode type. In the anode circuit of the valve 8, an inductor 9 and a capacitor 10 are connected and are tuned to the desired frequency. The anode potential for the valve 8 is provided by means of a direct-current source 11, which is connected, as illustrated, into the control network. In addition, a resistor 12 is connected in the anode circuit of the valve 8 across which the control potential, to overcome the biasing potential provided by the battery 7, may be applied. An inductor 13 is provided in the grid circuit of the valve 8 and is connected to the grid through a capacitor 14 and a leakage resistor 15. The inductors 9 and 13 are so coupled with each other that self-excited oscillations occur. Depending upon the inductance of the inductor 9 and the capacitance of the capacitor 10, high or audio frequency oscillations are generated, as will be readily understood.

In order to periodically control the flow of current to the transformer 1, a metal template 17 is provided, which is arranged to be driven preferably by means of a synchronous motor 16 connected to the source of alternating current, as illustrated. The shape of the template 17 is shown in Fig. 2 of the drawing. It will be observed that the template 17 is provided with teeth on the periphery thereof which lie in the space between the inductors 9 and 13 so that they are screened from each other when one of the teeth of the template 17 lies between them. The inductors 9 and 13 are so arranged that a considerable effect on the degree of back-coupling occurs by reason of the screening effect, and thereby the oscillations of the generator are either entirely or substantially entirely suspended.

In operation, as long as a notch or gap between two teeth of the template 17 is positioned between the inductors 9 and 13, strong oscillations are produced by the oscillation generator, as a result of which the capacitor 14 and the grid of the valve 8 are charged to a negative potential and the anode current is at a minimum. If, on the other hand, a tooth of the template 17 lies between the inductors 9 and 13, the oscillations of the generator are either completely suppressed or substantially completely suppressed, and the capacitor 14 is discharged through the leakage resistor 15. A current then flows in the anode circuit of the valve 8. The relationship between the value of anode current flowing when the oscillations are suppressed and its value when the self-excited oscillations are present may readily be of the ratio of 10:1. Corresponding to this relationship, the direction and magnitude of the potential drop in the resistor 12 changes. When the higher value of the anode current flows through the resistor 12, the biasing potential of the source 7 is overcome, and the valves 2 and 3 are rendered conducting as long as the oscillations are suppressed. It will, therefore, be apparent that the number of cycles of the alternating current that is periodically permitted to flow depends upon the shape and size of the template 17 and its speed of rotation and its control of the generation of high frequency oscillations by the oscillating circuit.

Since the anode current of the valve 8 may be continuously varied as a function of the change of back-coupling, the value of the welding current may be given any desired characteristic by suitably forming the template 17. By changing the rotational speed of the template 17, the frequency of the modulation may be influenced over a comparatively wide range. In order to change the speed of the template 17, a driving connection having a variable speed characteristic may be employed between the motor 16 and the template 17, or a motor may be used, the speed of which may be varied.

If it is desired that the relationship between the time during which the welding current is permitted to flow and the time during which it is not permitted to flow be controlled without changing the template, a template 18 having triangular teeth, as shown in Fig. 3 of the drawing, may be employed. By radially displacing the template 18 with reference to the inductors 9 and 13 by means of a lead screw 19, the interval of time during which the control potential is impressed on the resistor 12 may be varied.

It will be observed that substantially no energy is necessary for controlling the functioning of the valve 8. Since this is true, the template 17 or 18 may be constructed of very light material, and when so constructed may be driven by means of a device of the type of a watt-hour meter. The drive system itself may be constructed as a template in the form of Ferraris discs or parallel discs of watt-hour meters. The regulation of the rotational speed may then be effected by regulating the driving energy for the disc or by varying the effects of the damping winding of such devices as desired. The damping winding may be adjutably constructed so that it operates on the disc with a greater or smaller lever arm, or its effect may be electrically controlled by varying the value of the exciting current.

The template 17 or 18, with an appropriate driving mechanism, and including the high-frequency generator and the valve 8, may be mounted in a single housing as a unit and enclosed in a dirt-tight compartment.

In lieu of a rotating template, as illustrated in the drawing, a lug having translational oscillations, as provided by a Wagner hammer, may be utilized. In such an arrangement, the lug would be periodically positioned between the inductors 9 and 13 and the frequency of the oscillations may be controlled by varying the external force. The degree of back-coupling of the valve 8 may be varied in a different manner than shown in Fig. 1 of the drawing. For example, the anode circuit and the grid circuit may be tuned together, and by means of the template, either 17 or 18, the tuning therebetween may be varied. A capacitive back-coupling may also be utilized, and the magnitude of the capacitance of the back-coupling capacitor may be varied in accordance with the operation of the template.

Since other changes may be made in the foregoing constructions and different embodiments of the invention may be made without departing from the scope thereof, it is intended that all matter shown in the accompanying drawing or described in the foregoing specification shall be interpreted as illustrative and not in a limiting sense.

I claim as my invention:

1. An electric control system comprising, in combination, circuit means for connecting a load device to a source of alternating current, electric valve means interposed in said circuit means to control the flow of current to said load device, control means for said valve means, a high frequency generator connected to said control means, and means for periodically decreasing the effect of the oscillations of said generator to periodically render said valve means conducting.

2. An electric conrtol system comprising, in combination, circuit means for connecting a load device to a source of alternating current, electric valve means interposed in said circuit means to control the flow of current to said load device, control means for said valve means, biasing means connected to said control means and disposed to maintain said valve means in the non-conducting state, high frequency generating means connected to said control means, and means for periodically decreasing the effect of the oscillations of said generator to periodically overcome the effect of said biasing means thereby periodically rendering said valve means conducting.

3. An electric control system comprising, in combination, a circuit means for connecting a load device to a source of alternating current, electric valve means interposed in said circuit means to control the flow of current to said load device, control means for said valve means, biasing means connected to said control means and disposed to maintain said valve means in the non-conducting state, high frequency generating means connected to said control means, means for recurrently decreasing the magnitude of the oscillations of said generator during intervals of predetermined length to overcome the effect of said biasing means and render said valve means conducting during said intervals, and means for varying the length of said intervals.

4. An electric control system comprising, in combination, circuit means for connecting a load device to a source of alternating current, electric valve means interposed in said circuit means to control the flow of current to said load device, control means for said valve means, biasing means connected to said control means and disposed to maintain said valve means in the non-conducting state, a high frequency generator including a plurality of inductively related inductors connected to said control means, and means for periodically varying the coupling between said inductors for intervals of predetermined length to overcome the effect of said biasing means and render said valve means conducting during said intervals.

5. An electric control system comprising, in combination, circuit means for connecting a load device to a source of alternating current, electric valve means interposed in said circuit means to control the flow of current to said load device, control means for said valve means, biasing means connected to said control means and disposed to maintain said valve means in the non-conducting state, a high frequency generator including a plurality of inductively related inductors connected to said control means, a movable member, driving means for moving said member at a speed corresponding to the frequency of said alternating current source, and means carried by said movable member and disposed to periodically vary the coupling between said inductors for intervals of predetermined length to overcome the effect of said biasing means and render said valve means conducting during said intervals.

6. An electric control system comprising, in combination, circuit means for connecting a load device to a source of alternating current, electric valve means interposed in said circuit means to control the flow of current to said load device, control means for said valve means, biasing means connected to said control means and disposed to maintain said valve means in the non-conducting state, a high frequency generator including a plurality of inductively related inductors connected to said control means, a metallic disc having uniformly spaced teeth in the periphery thereof and disposed relative to said inductors in such manner that the coupling therebetween is varied as said teeth are moved relatively thereto, and driving means disposed to rotate said disc at a speed corresponding to the frequency of said alternating current source, thereby periodically varying the coupling between said inductors for intervals of predetermined length to overcome the effect of said biasing means and render said valve means conducting during said intervals.

7. An electric control system comprising, in combination, circuit means for connecting a load device to a source of alternating current, a pair of inversely connected electric valves interposed in said circuit means to control the flow of current to said load device, and high frequency impulsing means disposed to periodically vary the conductivity of said valves.

8. An electric control system comprising, in combination, circuit means for connecting a load device to a source of alternating current, a pair of inversely connected electric valves interposed in said circuit means to control the flow of current to said load device, and high frequency generating means disposed to render said valves conducting during a predetermined number of cycles of the alternating current and to produce substantially no effect on the conductivity thereof during a predetermined number of cycles of the alternating current.

9. An electric control system comprising, in combination, circuit means for connecting a load device to a source of alternating current, a pair of inversely connected electric valves interposed in said circuit means to control the flow of current to said load device, control means for said valves, high frequency generating means connected to said control means, and means for periodically varying the magnitude of the oscillations of said generating means to correspondingly vary the conductivity of said valves.

10. An electric control system comprising, in combination, circuit means for connecting a load device to a source of alternating current, a pair of inversely connected electric valves interposed in said circuit means to control the flow of current to said load device, control means for said valves, a high frequency generator connected to said control means, and means for periodically decreasing the effect of the oscillations of said generator to periodically permit said valves to conduct alternating current to said load device.

11. An electric control system comprising, in combination, circuit means for connecting a load device to a source of alternating current, a pair of inversely connected electric valves interposed in said circuit means to control the flow of current to said load device, a control circuit for said valves, biasing means connected in said control circuit and disposed to maintain said valves in the non-conducting state, a high frequency generator connected to said control circuit, and means for periodically decreasing the effect of the oscillations of said generator to periodically overcome the effect of said biasing means and permit said valves to conduct alternating current to said load device.

12. An electric control system comprising, in combination, circuit means for connecting a load device to a source of alternating current, a pair of inversely connected electric valves interposed in said circuit means to control the flow of current to said load device, a control circuit for said valves, biasing means connected in said control circuit and disposed to maintain said valves in the non-conducting state, a high frequency generator connected to said control circuit, means for recurrently decreasing the magnitude of the oscillations of said generator during intervals of predetermined length to overcome the effect of said biasing means and permit said valves to conduct alternating current to said load device during said intervals, and means for varying the length of said intervals.

13. An electric control system comprising, in combination, circuit means for connecting a load device to a source of alternating current, a pair of inversely connected electric valves interposed in said circuit means to control the flow of current to said load device, a control circuit for said valves, biasing means connected in said control circuit and disposed to maintain said valves in the non-conducting state, a high frequency generator including a plurality of inductively related inductors connected to said control circuit, and means for periodically varying the coupling between said inductors for intervals of predetermined length to overcome the effect of said biasing means and permit said valves to conduct alternating current to said load device.

14. An electric control system comprising, in combination, circuit means for connecting a load device to a source of alternating current, a pair of inversely connected electric valves interposed in said circuit means to control the flow of current to said load device, a control circuit for said valves, biasing means connected in said control circuit and disposed to maintain said valves in the non-conducting state, a high frequency generator including a plurality of inductively related inductors connected to said control circuit, a movable member, driving means for moving said member at a speed corresponding to the frequency of said alternating current source, and means carried by said movable member and disposed to periodically vary the coupling between said inductors for intervals of predetermined length to overcome the effect of said biasing means and permit said valves to conduct alternating current to said load device during said intervals.

15. An electric control system for controlling the supply of current from a source of periodically pulsating current to a load in discrete current impulses, each impulse being a predetermined number of said pulsations in length comprising, in combination, circuit means for connecting said load to said source, means including a high frequency generator operatively connected to said circuit means and disposed when said generator is operating in a predetermined frequency range to cause substantially no effect on the functioning of said circuit means, and means for changing the frequency of said generator to a frequency lower than said predetermined range at regular time intervals for an interval of time sufficiently long to control the current flow from said source through said load.

16. An electric control system comprising, in combination, circuit means for connecting a load device to a current source, valve means interposed in said circuit means, biasing means disposed to maintain said valve means in the non-conducting state, a high frequency generator connected to said biasing means and disposed when operating in a predetermined frequency range to cause substantially no effect on the functioning of said valve means, and means for causing said generator to cease functioning as such and to permit the flow of direct current in such manner as to overcome the effect of said biasing means and to render said valve means conducting, thereby permitting current to flow to said load device.

HEINRICH SCHEWE.